(12) United States Patent
Ikebe et al.

(10) Patent No.: US 6,282,059 B1
(45) Date of Patent: Aug. 28, 2001

(54) DISK CARTRIDGE

(75) Inventors: Masaru Ikebe; Takateru Satoh, both of Saku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 08/426,069

(22) Filed: Apr. 21, 1995

(30) Foreign Application Priority Data

Apr. 26, 1994 (JP) .................................................... 6-109182

(51) Int. Cl.⁷ .................................................. G11B 23/03
(52) U.S. Cl. ............................................................ 360/133
(58) Field of Search ............................. 360/133; 369/291

(56) References Cited

U.S. PATENT DOCUMENTS

| | | | | |
|---|---|---|---|---|
| 4,794,479 | * | 12/1988 | Nakanishi | 360/99.12 |
| 4,797,770 | * | 1/1989 | Takahasi | 369/291 |
| 5,323,382 | * | 6/1994 | Takahashi | 360/133 |

FOREIGN PATENT DOCUMENTS

| | | | | |
|---|---|---|---|---|
| 0218231 | * | 4/1987 | (EP) | 360/133 A |
| 56377 | | 4/1983 | (JP) . | |
| 6-36494 | * | 2/1994 | (JP) | 360/133 |
| 60592 | | 3/1994 | (JP) . | |

* cited by examiner

Primary Examiner—Allen T. Cao
(74) Attorney, Agent, or Firm—Wood, Phillips, VanSanten, Clark & Mortimer

(57) ABSTRACT

A cartridge comprises a case consisting of upper and lower shells joined and containing a medium, a shutter which slides astride over one edge portion of the case to open or close a slot formed in the case to expose the medium partly, and a locking member which keeps the shutter in the closing position immovably. The locking member is normally, except when unlocked, exposed partly in a recess for the access of an unlocking member, so that a push of the exposed portion of the locking member disengages it from a projection formed on the inner side of the outer edge of the shutter. Confining structure is provided for confining the position of the exposed portion of the locking member always to the inside of the line extended from the end face of the shutter is provided between the exposed portion and the interior surface of the case.

6 Claims, 4 Drawing Sheets

DISK CARTRIDGE

BACKGROUND OF THE INVENTION

This invention relates to a cartridge for recording medium, and more specifically to a shutter for opening and closing the head access slot of a cartridge for recording medium.

A conventional disk cartridge for recording medium will be described below in conjunction with FIG. 1 illustrating an embodiment of the present invention. Generally, a disk cartridge 10 is equipped with a shutter 50 that opens and closes openings 31 formed in the upper and lower shells of the cartridge case, the openings combinedly forming a slot for the access of a magnetic head. When the cartridge is not in use, the shutter 50 is urged by a spring in one direction to close the head slot 31 (FIG. 1(a)) and, when the cartridge is used, the shutter is moved in the opposite direction by a mechanism of a drive unit to an open position (FIG. 1(b)). The shutters of this character in extensive use thus depend merely on spring action for their closure and can be easily opened by children. The tampering can damage the recording media housed in the cartridges. Because of this concern and also because of the potential application to the cartridges for game software, an early improvement in the closing mechanism has been awaited.

Provision of some locking member to keep the shutter immovable when not in use has already been proposed.

However, the prior art cartridges equipped with such locking members have one disadvantage or another. For example, the cartridge must be thick enough to form a groove or notch that is required to receive an unlocking member (Japanese Utility Model Application Kokai No. 56377/1983). An unlocking part for the locking member provided in the space between the upper and lower case shells or inside the shutter complicates the construction of the unlocking member and the shutter opening-closing member on the part of the recording-reproducing unit (Japanese Patent Application Kokai No. 56377/1994).

The prior art structures will now be considered in detail. FIG. 4 shows a shutter locking mechanism for a disk cartridge described in Utility Model Application Kokai No. 56377/1983. A slide shutter 120 is disposed between upper and lower shells 111 (only one of which is shown) of a cartridge case containing a magnetic disk. The shutter is biased by a spring in the direction of an arrow A. In one piece with the inner wall at a corner of the case made up of the upper and lower shells, there is formed a locking member 133 having a locking pawl 137 at the front end, generally in the form of a cantilever plate spring. The locking member 133 is formed substantially in parallel with one edge of the case. The space above the locking member 133 constitutes a guide groove 125 defined by the upper and lower shells, along which an unlocking pin 128 of a recording-reproducing unit is to slide.

Normally the shutter 120 is shifted in the direction of an arrow A where its locking hole 139 is engaged with the locking pawl 137. As the disk cartridge is loaded into the recording-reproducing unit, the unlocking pin 128 enters the guide groove 124 from the direction of an arrow B, depresses a protuberance 138 of the locking member 133, thereby releasing the pawl 137 from the locking hole 139 of the shutter 120, and finally opens up the shutter 120.

The locking mechanism is disadvantageous in that the guide groove 125 required to guide the unlocking pin renders it impossible to reduce the overall thickness of the case of the disk cartridge. Another disadvantage is the questionable reliability of locking, since the locking member, a cantilever type having the locking pawl 137 distant from the supported base and molded of plastic material, becomes unable to maintain precise locking pawl engagement after repeated use.

Patent Application Kokai No. 60592/1994 teaches a shutter locking spring 206 as shown in FIG. 5. A slide shutter 202 is mounted astride on one edge portion of a disk cartridge 201 and is normally biased leftwards as viewed in the figure by a spring 205. The shutter locking spring 206 is a cantilever spring fixed at the base to the cartridge case. It has a locking dent 207 near its free end, which is adapted to receive a locking protuberance 203 formed on the shutter, so as to lock the shutter in the closing position. The case is formed with a groove 214 to receive an unlocking pin 210.

This locking mechanism again requires the groove 214 to guide the unlocking pin, which hampers an effort to reduce the overall thickness of the disk cartridge case. Similarly, the other disadvantage is the inability of ensuring positive locking. The cantilever type locking member, the long distance from its base to the locking dent 207, and the plastic molding combine to make it gradually difficult, after repeated use, to maintain exact locking pawl engagement.

In view of these, there has been a demand for a cartridge that eliminates these disadvantages of the prior art and provides perfect protection for the recording medium contained.

The present invention therefore has for its object to provide a cartridge whose shutter can be positively locked when closed to provide perfect protection for the recording medium, and which is reduced in overall thickness and simplifies the unlocking mechanism and shutter-opening-closing mechanism of the recording-reproducing unit with which the cartridge is used.

SUMMARY OF THE INVENTION

The cartridge according to this invention comprises a case consisting of upper and lower shells joined and containing a medium, a shutter which slides astride over one edge portion of the case to open or close a slot formed in the case to expose the medium partly, and a locking member which keeps the shutter in the closing position immovably, said locking member being normally, except when unlocked, exposed partly in a recess for the access of an unlocking member, so that a push of the exposed portion of the locking member disengages it from a projection formed on the inner side of the outer edge of the shutter.

Preferably, means for confining the position of the exposed portion of the locking member always to the inside of the line extended from the end face of the shutter, is fixed to the interior surface of the case.

To be more concrete, the end face of the case has a recess formed in the portion adjacent to the shutter, defined by a cutout across the entire thickness of the case, to receive an unlocking member from a recording-reproducing unit, while the locking member is partly exposed to the recess so that when the unlocking member pushes the locking member on the exposed portion the locking member is disengaged from the projection inside the end face of the shutter.

The recess for the access of the unlocking member, thus formed by a cutout across the entire thickness of the case, permits the use of an unlocking pin thinner than the disk cartridge, rendering it possible to reduce the thickness of the cartridge accordingly.

Moreover, the means for confining the position of the exposed portion of the locking member always to the inside of the line extended from the end face of the shutter ensures exact locking pawl engagement regardless of qualitative dispersion among the locking members produced or of minor errors in their assembling. The means also avoids direct contact with the fingers from the outside and prevents the opening of the shutter by tampering.

More preferably, the locking member comprises a base secured to the inner wall of the case, a back exposed to the cutout recess, a hooked head extending from the back and made engageable with an engaging projection formed in the shutter, and a flexible leg formed between the base and the back to urge the hooked head normally in the direction of the projection. Still more preferably, the locking member further comprises means for confining its exposed portion always to the inside of the line defined by the end face of the shutter. The confining means may consist of an arm formed in one piece with the back, the arm being limited in motion by a confining rib formed integrally with the inner surface of the case.

DESCRIPTION OF THE PREFERRED EMBODIMENT

The present invention will now be described in detail with reference to the accompanying drawings showing a preferred embodiment thereof.

Figure 1:
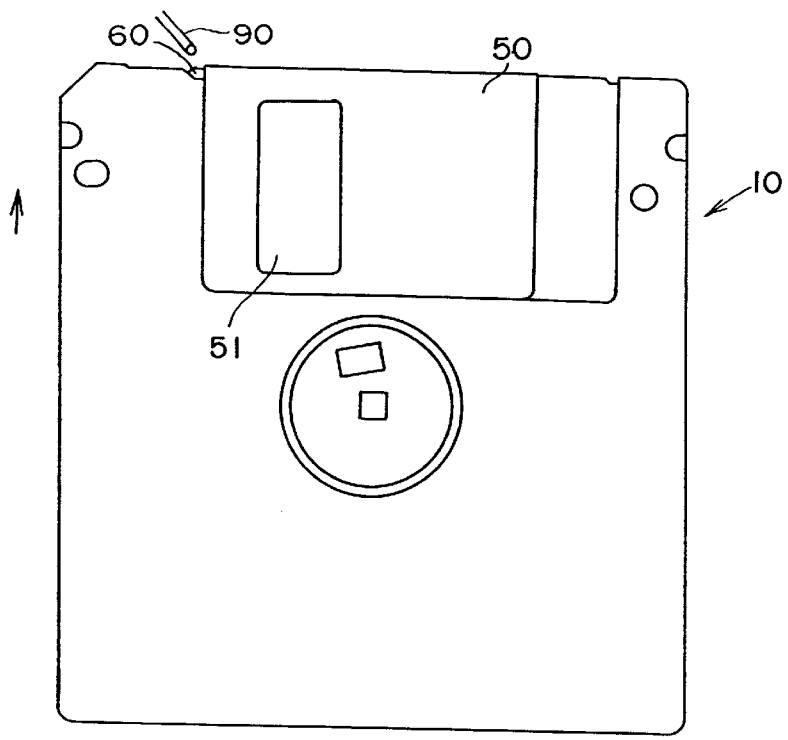
FIG. 1(a) is a bottom view of a cartridge embodying the invention, indicating the shutter position when the cartridge is not in use.
FIG. 1(b) is the bottom view of the cartridge, showing the shutter position when the cartridge is in use.
Figure 1:
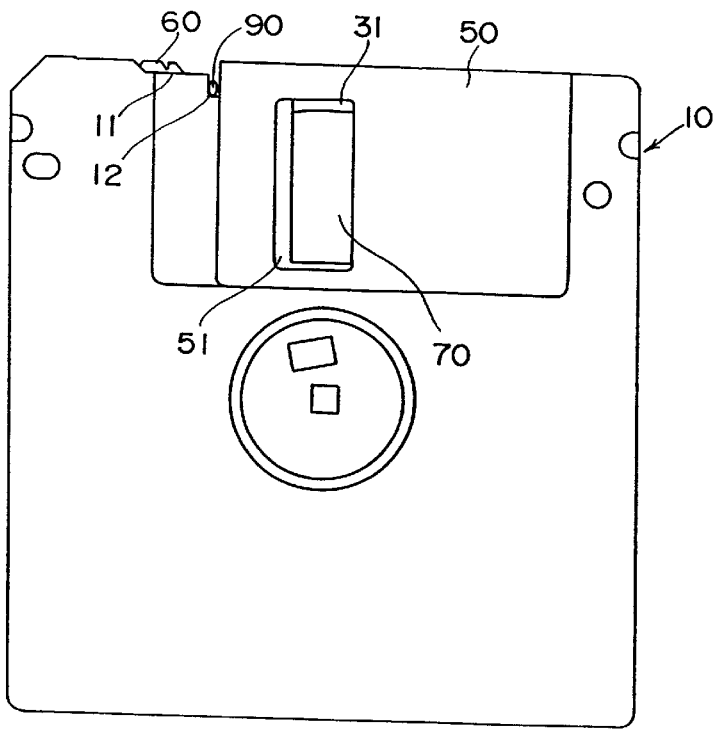
Figure 2:
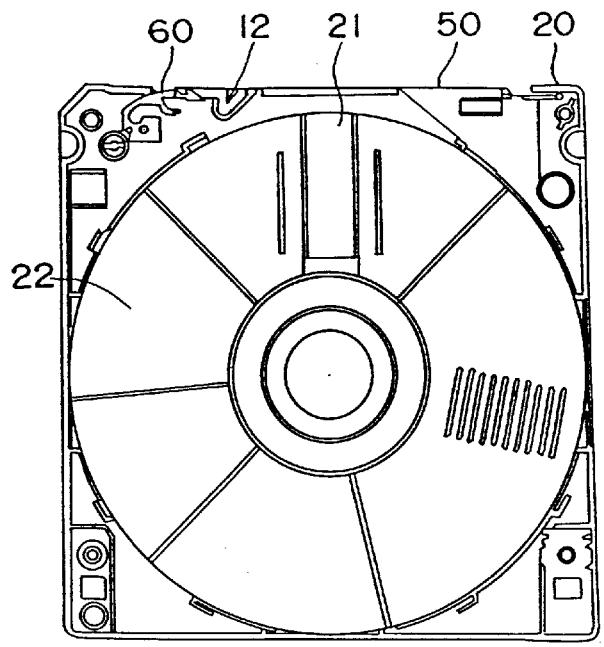
FIG. 2(a) is an inside view of the upper shell of the cartridge embodying the invention.
FIG. 2(b) is an inside view of the lower shell of the cartridge.
Figure 2:
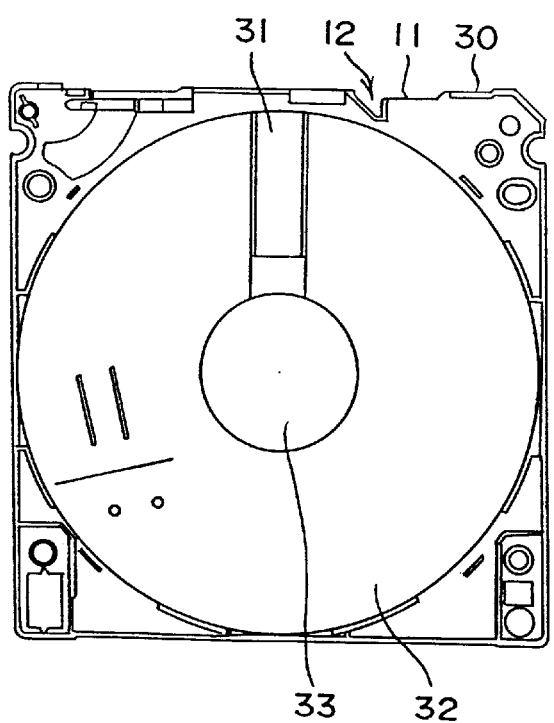

FIGS. 1(a) and (b) are bottom views of a cartridge 10 of the invention for recording media showing, respectively, the positions of a shutter 50 when the cartridge is not in use and when in use. FIGS. 2(a) and (b) are plan views showing, respectively, the interiors of an upper shell 20 and a lower shell 30 that comprise the cartridge 10 of the invention.

The cartridge 10 according to the invention is essentially made up of the upper shell 20, the lower shell 30 that mates the upper shell to form a case in which a recording medium 70 is contained, the shutter 50 that is slidably held astride over a part of the upper shell 20 and lower shell 30 combined (FIG. 1), and a locking member 60 that holds fast the shutter 50 when not in use.

The upper shell 20 has a slot opening 21 to receive a magnetic head and a chamber 22 to contain a recording medium. The lower shell 30 has a magnetic head-receiving slot opening 31, a recording medium chamber 32, and a center hole 33.

The shutter 50 slidably sits astride on one end face 11 formed by the upper portions, as viewed in the drawings, of the upper shell 20 and lower shell 30. It is urged by an internally loaded spring to normally close the both slot openings 21 and 31. The shutter 50 itself has two magnetic head-receiving slot openings 51, one facing the upper shell 20 and the other the lower shell 30. When the shutter is used, the slot openings 51 come in register with the slot openings 21 and 31 of the upper and lower shells to expose the recording medium partly on both sides. The shutter 50 has a projection 52 formed on the inner side of the edge (FIG. 3) adapted to engage with the locking member 60 when the shutter is not in use.

Figure 3:
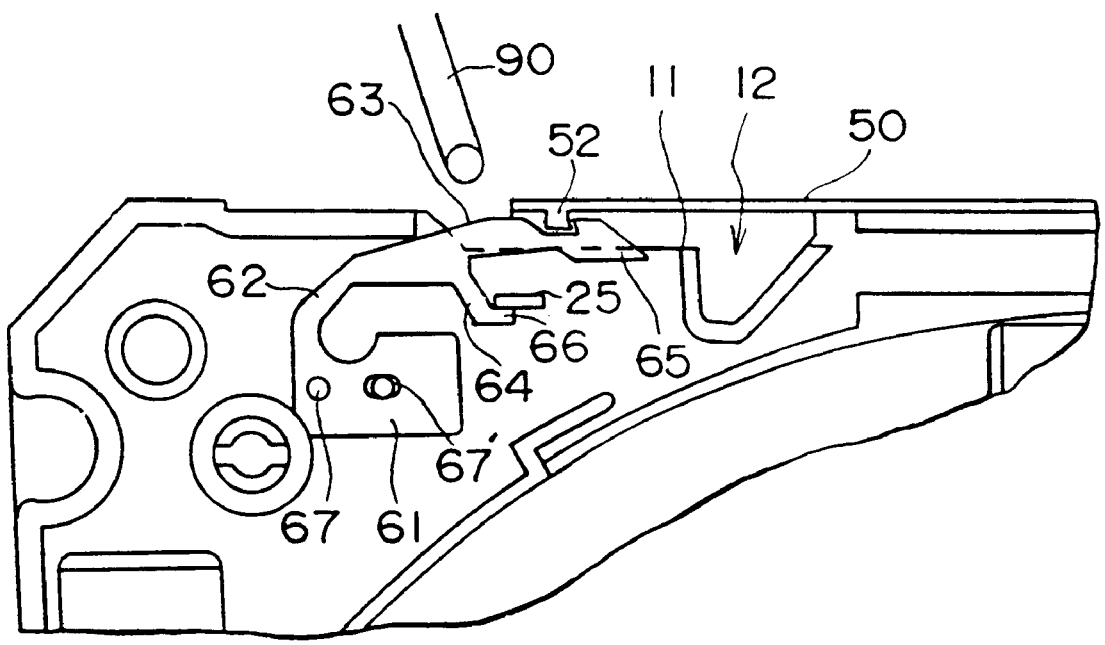
FIG. 3 is a plan view, on an enlarged scale, of the locking member and associated parts in the upper shell.
Figure 4:
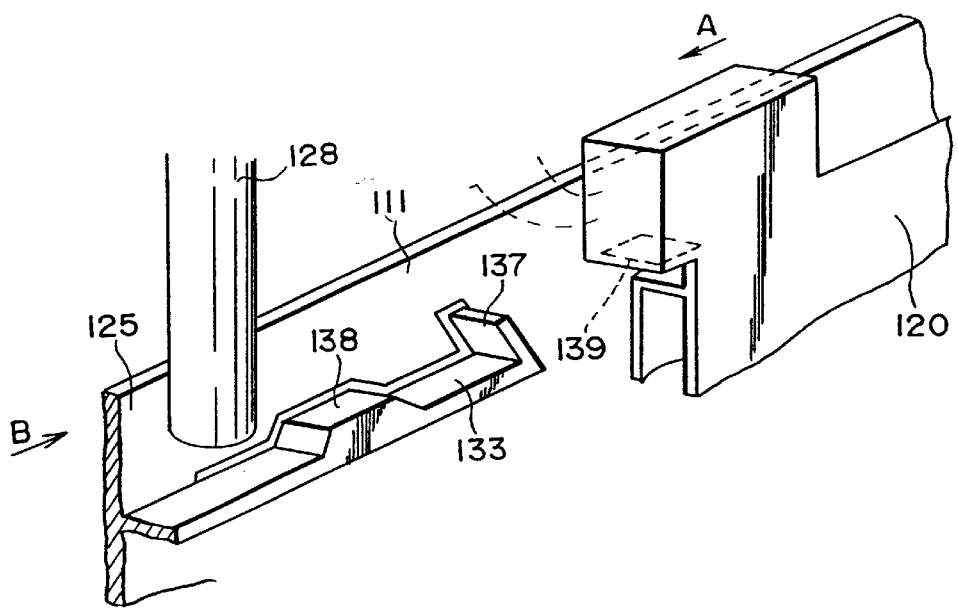
FIG. 4 is a perspective view of a conventional disk cartridge equipped with a locking mechanism.
Figure 5:
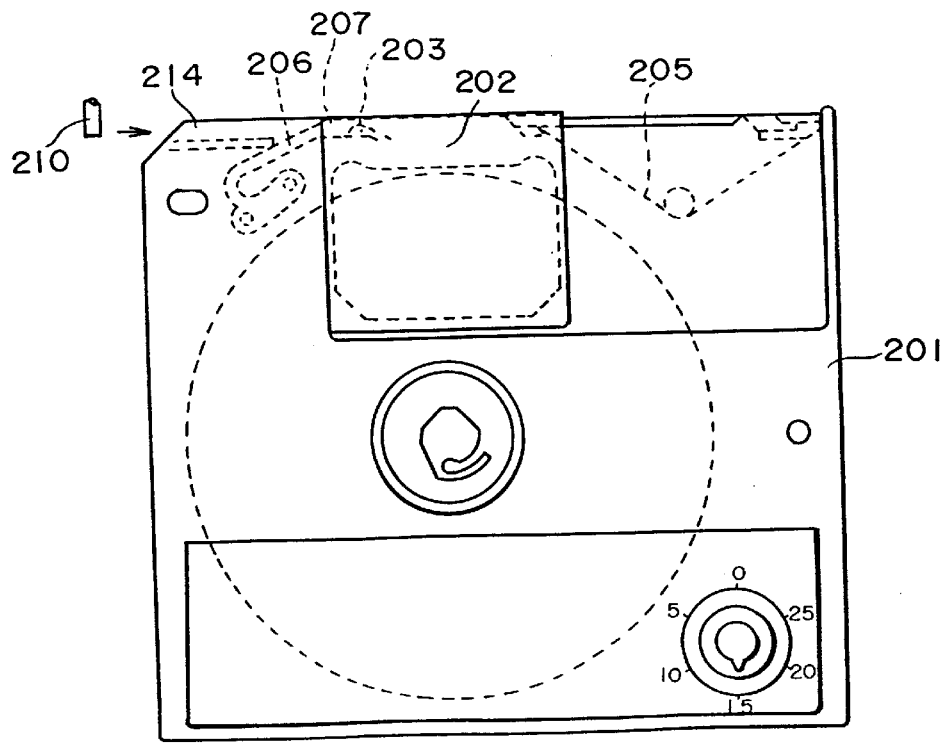
FIG. 5 is a front view of another disk cartridge of the prior art equipped with a locking mechanism.

FIG. 3 is an enlarged view of the locking member 60 shown in FIG. 2(a). The locking member 60, a one-piece molding of elastic plastic material such as polyoxymethylene or polypropylene, consists of a base 61, a flexible leg 62 that imparts elasticity to the locking member, a back 63, an arm 64, and a hooked head 65. This member is fixedly secured to the upper shell 20 at two points 67 and 67' of the base 61 in such a manner that the back 63 and the head 65 protrude upwardly from the end face 11 of the case (FIG. 1(a) and FIG. 3). Thus the back 63 and the head 65 of the locking member 60 are made movable in the region close to the end face 11 between the inner walls of the upper and lower shells. The leg 62 is slender enough to flex properly between the base and the body. In order to confine the protrusion (exposure) of the back 63 and the head 65 within a region below the end face of the shutter, the arm 64 has a hand 66 that engages with a rib 25 of the upper shell 20. It is an important design feature of the present invention that, as indicated in FIG. 1(a) and FIG. 3, the back 63 is exposed in a recess for receiving an unlocking member, defined by a cutout extending from the end face 11 to the entire thickness of the case, while it is exposed uncovered by the shutter 50 either.

Now the actions of the locking member 60 and the shutter 50 will be explained. As the cartridge 10 is loaded into a recording-reproducing unit (not shown), an unlocking member of the unit, or a pin 90 as shown in FIG. 3, pushes down the outwardly exposed back 63 of the locking member 60, together with its head 65, into the case beneath the end face 11. The downward motion disengages the head from the projection 52 of the shutter 50. The pin 90 then moves the shutter 50 while it travels along the end face 11 of the case. Finally, the pin 90 gains entrance into a notch 12 provided for the pin, where it keeps the shutter 50 still. This state represents the reproduction stage of the cartridge, with the magnetic head-receiving slot kept open, as in FIG. 1(b). The width of the slot formed in the end face 11 between the upper shell 20 and the lower shell 30 is slightly greater than the thickness of the locking member so as to allow the latter to slide. This is another design feature of the invention.

When the pin 90 is subsequently pulled away from the notch 12, the shutter 50 is brought back under the urging of the spring to the state shown in FIG. 1(a). Meanwhile the projection 52 of the shutter is guided along the taper at the front end of the locking member 60 until it is engaged with the hook of the head 65. The head 65 of the locking member 60 thus keeps the shutter 50 immovably.

In the construction described, the recess formed of a cutout across the entire thickness of the case to receive the unlocking member makes it possible to reduce the thickness of the cartridge to the same as or smaller than the diameter of the locking pin and thus provide a thinner disk cartridge than heretofore.

The means for confining the position of the exposed portion of the locking member always to the inside of the line extended from the end face of the shutter ensures exact locking pawl engagement regardless of qualitative dispersion that might arise from the manufacture of locking members or of minor errors in their assembling. The means also avoids direct contact with the fingers from the outside and prevents the opening of the shutter by tampering.

In addition, because it requires no guide groove, the lock structure of the invention is simplified in construction.

Although the form of the present invention taken as a preferred embodiment thereof has been shown and described herein, it will be obvious to those skilled in the art that various changes and modifications may be made without departing from the spirit and scope of the invention. It is intended to cover in the appended claims all such changes and modifications as fall within the spirit and scope of the invention.

What is claimed is:

1. A cartridge which comprises a case consisting of upper and lower shells joined and containing a recording medium therein, said case having a slot formed to expose the recording medium partly, a shutter which rests astride on one edge portion of the case and is slidable between an open position where the shutter opens the slot and a closed position where the shutter closes the slot, and a locking member which keeps the shutter in the closed position, said case having a recess formed in a portion of a peripheral edge of said case adjacent and external to the shutter, defined by a cutout across the entire thickness of the case, to receive an unlocking member from a recording-reproducing unit, said locking member having an exposed portion exposed partly in the recess for access of the unlocking member, so that when the unlocking member pushes the locking member on the exposed portion, a hooked head of the locking member is disengaged from an engaging projection formed inside an end face of the shutter.

2. A cartridge according to claim 1 wherein said locking member comprises a base secured to an inner wall of the case, a back defining the exposed portion exposed to the cutout recess for the access of the unlocking member, the hooked head extending from the back and made engageable with the engaging projection formed in the shutter, and a flexible leg formed between the base and the back to urge the hooked head normally in the direction of the projection for locking engagement.

3. A cartridge according to claim 1 wherein said locking member comprises a base secured to an inner wall of the case, a back defining the exposed portion exposed to the cutout recess for the access of the unlocking member, the engaging projection formed in the shutter, a flexible leg formed between the base and the back to urge the hooked head normally in the direction of the projection for locking engagement, and means for confining the exposed portion always inside of a line defined by the end face of the shutter.

4. A cartridge according to claim 1 wherein said exposed portion of the locking member remains exposed to the outside even when the shutter is closed, and the locking member comprises a base secured to an inner wall of the case, a back defining the exposed portion exposed to the cutout recess for the access of the unlocking member, the hooked head extending from the back and made engageable with the engaging projection formed in the shutter, and a flexible leg formed between the base and the back to urge the hooked head normally in the direction of the projection for locking engagement.

5. A cartridge according to claim 3 wherein said case has a rib securely formed on the inner wall thereof and said confining means is an arm formed in one piece with the back and engaging the rib to limit motion of the arm.

6. A cartridge which comprises a case consisting of upper and lower shells joined and containing a recording medium therein, said case having a slot formed to expose the recording medium partly, a shutter which rests astride on an edge portion of the case and is slidable between an open position where the shutter opens the slot and a closed position where the shutter closes the slot and a locking member which keeps the shutter in the closed position, said case having a recess formed in a portion of a peripheral edge of said case adjacent and external to the shutter, defined by a cutout across the entire thickness of the case, to receive an unlocking member from a recording-reproducing unit, said locking member comprising a base secured to an inner wall of the case, a back having an exposed portion in said cutout recess for access of the unlocking member, a hooked head extending from said back and made engageable with an engaging projection formed in the inside of said shutter, a flexible leg formed between the base and the back to urge said hooked head normally in the direction of the projection for locking engagement, and means for confining the exposed portion always to the inside of said cutout recess.

* * * * *